[11] 3,621,914

| [72] | Inventor | Richard S. Fulford |
| --- | --- | --- |
|  |  | Tulsa, Okla. |
| [21] | Appl. No. | 4,099 |
| [22] | Filed | Jan. 19, 1970 |
| [45] | Patented | Nov. 23, 1971 |
| [73] | Assignee | Cities Service Oil Company |
|  |  | Continuation-in-part of application Ser. No. 880,390, Nov. 26, 1969. This application Jan. 19, 1970, Ser. No. 4,099 |

[54] STIMULATION AND SELECTIVE PLUGGING OF PETROLEUM RESERVOIRS
6 Claims, No Drawings

[52] U.S. Cl. .................................................. 166/282,
166/274, 166/271
[51] Int. Cl. ........................................................ E21b 43/27
[50] Field of Search............................................ 166/282, 305, 307, 271, 275, 274, 273; 252/8.55 B, 8.55 D; 106/72

[56] References Cited
UNITED STATES PATENTS

| 2,796,936 | 6/1957 | Sayre, Jr. et al. ............. | 166/307 |
| --- | --- | --- | --- |
| 2,935,475 | 5/1960 | Bernard...................... | 166/274 |
| 3,141,501 | 7/1964 | Bernard et al. ............... | 166/275 X |
| 3,309,211 | 3/1967 | Weiss et al................... | 106/72 |
| 3,508,613 | 4/1970 | Huff et al..................... | 166/307 |

Primary Examiner—Stephen J. Novosad
Attorney—J. Richard Geaman

ABSTRACT: Fractures or highly permeable streaks in a reservoir containing kaolinite are selectively plugged by the introduction of a solution containing hydrazine. The solution attacks the kaolinite-containing particles of the fractures or permeable streaks and decomposes the clay mineral bonds of the rock matrix. The decomposition process causes the walls of the pores to disintegrate and form individual grains of fine clay particles. Subsequent addition of treatment solution transposes the disintegrated particles and lodges them in the exposed pores of the fractures or permeable streaks. Further flow through the treated area is restricted and the reservoir is selectively plugged. Less permeable areas of the reservoir are somewhat stimulated by the kaolinite breakup with the dislodged clay particles from those areas seeking the more permeable channels in the reservoir and further plugging them. The reservoir is thereby both selectively plugged and stimulated by the solution treatment and the reservoir performance is enhanced.

STIMULATION AND SELECTIVE PLUGGING OF PETROLEUM RESERVOIRS

This application is a continuation-in-part of parent application, Ser. No. 880,390, filed Nov. 26, 1969, entitled STIMULATION AND SELECTIVE PLUGGING OF PETROLEUM RESERVOIRS.

BACKGROUND OF THE INVENTION

This invention relates to the recovery of hydrocarbons from subterranean hydrocarbon-containing reservoirs by varying the permeability therein. More particularly, it relates to the stimulation and selective plugging of kaolinite-containing reservoirs.

In the primary and secondary production of natural gas and petroleum from subterranean reservoirs one often encounters fractures and induced areas of high permeability. By permeability it is meant the measure of a reservoir's capacity for transporting fluid through its pores. This capacity is often expressed in petroleum engineering units as darcies or millidarcies. A darcy is that capacity of a reservoir rock necessary to allow the flow of 1 cubic centimeter of 1 centipoise viscosity fluid through 1 centimeter square of rock per second under a pressure gradient of 1 atmosphere per centimeter. Therefore, a given increase in permeability will result in the capability of an equivalent increase in flow through that portion of reservoir rock. Similarly, a decrease in permeability will result in an equivalent decrease in flow capacity in the reservoir rock.

When a reservoir rock is plugged, there exists a decrease in the rock permeability with the flow of reservoir fluids restricted and diverted to other portions of the reservoir matrix. During reservoir stimulation an increase in permeability is established and greater flow of reservoir fluid is afforded through the stimulated areas. The production interval of a hydrocarbon-containing reservoir is generally composed of strata of varying permeability. The areas of high permeability may be extremely porous or naturally fractured and thereby permit a high degree of fluid flow. The low-permeability areas, in turn, are formed of tight, less porous material and fluid flow is restricted by the configuration of the rock matrix. Since few rock formations are homogenous, the heterogeneity of the formation must be considered as a restraint in petroleum and natural gas production. It is desirable to treat the less permeable zones of the reservoir by stimulation, thereby affording a greater capacity through which to flow the reservoir fluids. Simultaneously, it is desirable to reduce the flow capacity of the more permeable productive zones such that natural production or induced gas or water drives are not generally restricted to these areas of the reservoir.

Previous methods of combating the heterogeneity of reservoirs have involved complex stimulation techniques such as hydraulically fracturing, acidizing or detonating the less permeable reservoir zones and packing off or plugging the more permeable reservoir strata. Simultaneous treatment of low- and high-permeability areas is tedious as it is difficult to direct the various treatment fluids to react only with specific formation intervals. The common result is to further restrict the tight zones and increase the permeable zones. The treatments are expensive and often only of short duration with the reservoir eventually returning to its original state. What is required is a reservoir treatment which will both stimulate the less permeable zones and selectively plug the more permeable zones of a reservoir simultaneously.

It is an object of this invention, therefore, to provide for an improved reservoir treatment technique.

It is another object of this invention to provide a method for selectively plugging and stimulating the productive zones of a hydrocarbon-containing reservoir.

It is still another object of this invention to provide a one-step reservoir treatment technique which will simultaneously selectively plug the more permeable productive zones of the reservoir.

It is a further object of this invention to provide a one-step reservoir treatment technique, which is both economical and uncomplicated, which will simultaneously selectively plug the more permeable and stimulate the less permeable productive intervals of a hydrocarbon-containing reservoir.

With these and other objects in mind, the invention is hereinafter set forth in the following description.

SUMMARY OF THE INVENTION

A method for treating a wellbore and surrounding reservoir of a well containing kaolinite and having an undesired condition of extreme permeability heterogeneity comprising, introducing a treating fluid, which comprises a solvent with hydrazine dissolved therein, into said well, through the wellbore of said well, and into the surrounding reservoir, said treating fluid simultaneously stimulates the less permeable strata and selectively plugs the more permeable strata and fractures of said wellbore and surrounding reservoir.

The treatment solution attacks the kaolinite particles and thereby disintegrates the clay mineral bonds of the rock matrix. This decomposition causes the clay particles to dislodge from the rock matrix. Further movement of fluid past the disintegrated sites removes the dislodged clay particles. As still further fluid is injected into the wellbore and reservoir, the dislodged particles become bound within the permeable streaks and fractures, thereby selectively plugging them. The clay particles are washed from the less permeable zones and leave them with a greater permeability than previous to treatment.

The wellbore and surrounding reservoir of the well are both simultaneously stimulated and selectively plugged by a one-step treatment affording greater permeability homogeneity throughout the reservoir and allowing greater hydrocarbon recovery. By applying a hydrazine solution of this type the operation is both economical and conducted with great simplication as compared to previous methods of treatment.

DETAILED DESCRIPTION OF THE INVENTION

As indicated, the present invention is a wellbore and reservoir treatment which requires no special equipment and application. The treatment solution utilized may be used in conjunction with any kaolinite-containing reservoir formation. In effect, most kaolinite formations are of the sandstone variety and in particular Berea and Bartlesville sandstones are quire susceptible to the treatment solution. Many hydrazine derivated compounds may be employed in conjunction with a solvent.

In carrying out this method of permeability adjustment the area of the reservoir to be treated by simultaneous stimulation and selective plugging is determined. A predetermined quantity of material to treat this area is injected into the wellbore and surrounding reservoir and generally is followed by an injection fluid in the case of secondary recovery or reservoir fluid production in the case of primary production. Many diverse application techniques may be used according to the reservoir treatment desired.

The reservoir treatment may be desired at a specific distance from the wellbore. The treating solution may be simultaneously injected with the normal injection fluid, for example, water in the case of secondary recovery, or be placed at a given distance from the wellbore by the use of a spacing liquid, for example water, liquified petroleum gas (LPG), natural gas, and carbon dioxide, in the case of primary recovery. The volume of spacing liquid or cumulative volume of simultaneous injection fluid plus treating solution to be used to treat the wellbore and reservoir surrounding the well may be determined by the equation $V = \pi r^2 hps$, where $r$ is the distance from the injection well to be treated, in feet; $h$ is the thickness of the zone being treated, in feet; $p$ is the porosity of the zone being treated, in fraction of total volume; and $s$ is the average water saturation of the zone to be treated, in faction of pore volume.

The quantity of the treatment solution required is completely dependent upon the kaolinite content of the formation. The decomposition of the kaolinite appears to be represented by the chemical balance for the hydrolysis of the kaolinite particles by a hydrazine solution. The reaction appears to be first swelling of the kaolinite particles due to the formation of a hydrogen bridge bond with a subsequent release of a water molecule due to the repulsion of the Van der Waals Forces. It has been found that hydrazine hydrate and hydrazine sulfate have proven especially adaptable for solution makeup and usage with water as the solvent.

It is a preferred embodiment of the invention to use a saturated or supersaturated solution of hydrazine to provide for the most complete and maximum deterioration of the contacted zones. A supersaturated solution is preferable when using the spacing technique, so that the treatment solution as it is driven from the well will have a near saturated concentration of hydrazine to contact the kaolinite particles. When large volumes are to be used it would not be economical to saturate all the injection fluid as in the simultaneous injection treatment technique. Therefore, the addition of a slug of saturated or supersaturated treating solution followed by spacing liquid would be acceptable. The preferred spacing liquid to be applied during a secondary recovery project would be the injection fluid used such as water in waterflooding, and LPG, natural gas or carbon dioxide in miscible displacement type recovery. For primary production, water, natural gas or other suitable, inexpensive spacing media may be applied.

The following example is presented to illustrate the effectiveness of the present invention:

EXAMPLE

A section of Berea sandstone having a 5 to 10 percent kaolinite content was cut to the dimensions of a diameter of 2 inches, and a length of 10 inches. This cut core of rock was found to be homogeneous and have a permeability of water of 11 millidarcies. The section was injected with a 10 percent by weight solution of hydrazine hydrate in water and allowed to stand in the core for 24 hours. The solution was then pumped out of the core and the permeability to water measured to be reduced to 4 millidarcies. Examination of the core after treatment revealed that the treatment broke down the kaolinite particles in this permeable streak and plugged the core with the dislodged particles.

The results of the example described above indicate that the permeable zones and fractures of the core were selectively plugged by the dislodged clay particles and subsequent flow in the permeable zones was reduced so as to restrict further flow therein. To further show the effects of a hydrazine solution upon kaolinite-containing rocks static tests were made to measure the amount of disaggregation of various hydrazine solutions. It can readily be discerned that the hydrazine solutions are quite effective as disaggregation means and will cause considerable simulating and plugging of kaolinite-containing rocks. The following table illustrates the amount of disaggregation experienced for the given time exposure to the hydrazine solution:

STATIC ROCK DISAGGREGATION

| Chemical | Concentration, g./100 ml. | Time required for disaggregation, hrs. | Percent of rock disaggregated | Rock type |
| --- | --- | --- | --- | --- |
| Hydrazine hydrate | 50–100 | 20 | 100 | Berea. |
| Do | 25 | 43 | 100 | Do. |
| Do | 100 | 0.5 | 100 | Kaolinite. |
| Do | 100 | 0.1 | 100 | Illite, montmorilionite. |
| Do | 100 | 48 | 100 | Chanute. |
| Do | 100 | 72 | 100 | Bluejacket. |
| Hydrazine sulfate | 4 | 20 | 25–50 | Berea. |

The present invention represents a significant advance in the art of well stimulation and selective plugging during the primary and secondary recovery of hydrocarbons. By providing a relatively simple and inexpensive method of treatment, the present invention avoids the heretofore existing complication in combating reservoir permeability heterogeneity. It should be understood and appreciated by those knowledgeable in the art that other embodiments of the present invention exist which are not disclosed herein without departing from the scope of the invention.

Therefore, I claim:

1. A method for treating a wellbore and surrounding reservoir of a well containing kaolinite and having an undesired condition of extreme permeability heterogeneity comprising:
   a. introducing a treating fluid, which comprises a solvent with a hydrazine derivative compound dissolved therein into said well, through the wellbore of said well and into the surrounding formation wherein the treating fluid breaks down the kaolinite structure of the reservoir in which it comes in contact to form high-permeability zones and aggregate clay particles; and
   b. introducing a spacing liquid into the reservoir through the wellbore previously treated to drive the aggregate clay particles formed by the degradation of the kaolinite into the more permeable strata and fractures of the wellbore and surrounding reservoir and thereby selectively plugging these areas while cleansing the less permeable zones of the wellbore and reservoir of the aggregate clay particles to raise the permeability therein.

2. The method of claim 1 in which the solvent is water.

3. The method of claim 2 in which the hydrazine compound is hydrazine hydrate.

4. The method of claim 2 in which the hydrazine compound is hydrazine sulfate.

5. The method of claim 2 in which the treating fluid is a saturated solution of the hydrazine derivative compound in the water.

6. The method of claim 2 in which the spacing liquid introduced subsequent to the treating fluid is selected from the group consisting of water, brine, LPG, natural gas, and carbon dioxide.

* * * * *